United States Patent [19]
Scott

[11] 3,757,499
[45] Sept. 11, 1973

[54] STIFFENED ABSOLUTE FILTER PACK
[75] Inventor: Robert D. Scott, West Covina, Calif.
[73] Assignee: Hepa Corporation, South El Monte, Calif.
[22] Filed: Nov. 4, 1971
[21] Appl. No.: 195,732

[52] U.S. Cl.................. 55/500, 55/521, 210/493
[51] Int. Cl............................................ B01d 27/08
[58] Field of Search............ 55/484, 483, 497–500, 55/521; 210/493

[56] References Cited
UNITED STATES PATENTS
2,952,333  9/1960  Bush ...................................... 55/500
3,127,258  3/1964  Revell ................................... 55/500
3,242,656  3/1966  Murphy, Jr. .......................... 55/500

FOREIGN PATENTS OR APPLICATIONS
856,686  12/1960  Great Britain ....................... 55/500

Primary Examiner—Bernard Nozick
Attorney—H. Calvin White et al.

[57] ABSTRACT

An absolute filter pack in which a thin wall plastic frame is used with a filter element. Additional support is provided intermediate the filter element ends by support members inserted in place of the usual spacers, whereby the fiberglass web filter is continuous across the frame opening and relatively more filter area is made available and seal points are reduced in comparison with subdivided filter packs.

6 Claims, 3 Drawing Figures

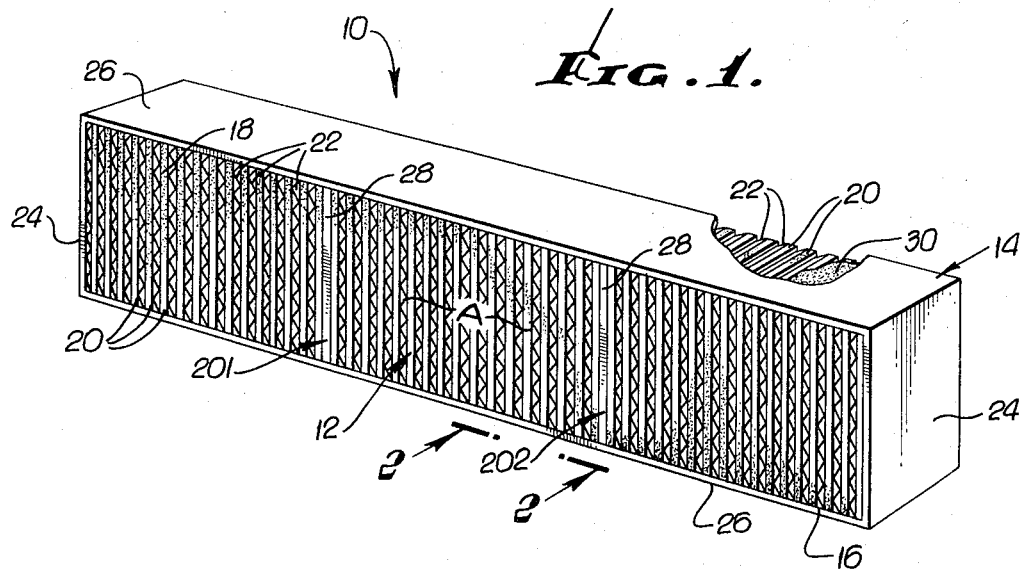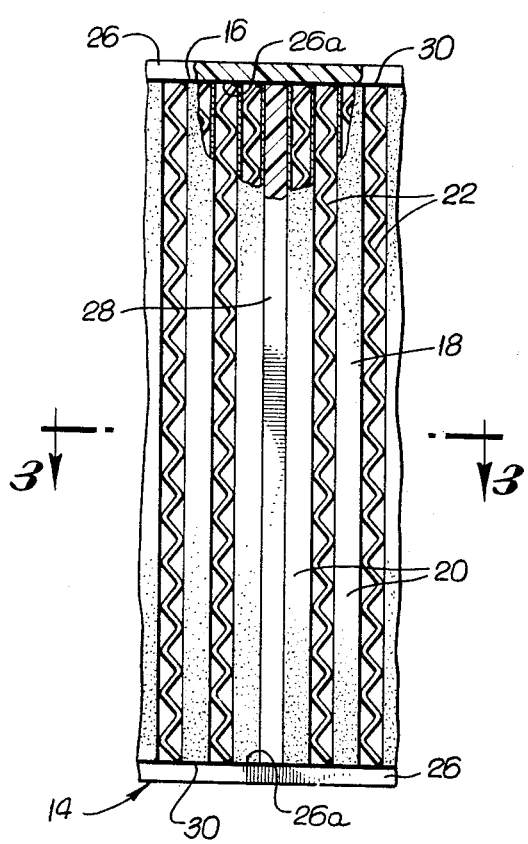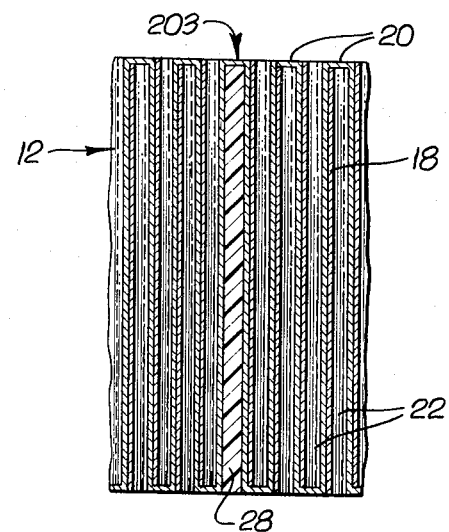

STIFFENED ABSOLUTE FILTER PACK

BACKGROUND OF THE INVENTION

This invention has to do with absolute filter packs and, more particularly, with improvements in such filter packs having relatively thin wall frames and relatively greater filter area than has been previously available. Such filter packs are useful for filtering air streams used in clean room operations or in equipment requiring cooling air flow free of contaminating dust, such as electronic equipment.

PRIOR ART

Absolute filter packs are well known. Typically these are units insertable into air passages to filter the air flow. As such the packs comprise a frame, generally but not necessarily rectangular and a filter element. The filter element is composed of a fiberglass web which has been repeatedly pleated, successive pleats being spaced with transversely corrugated metal spacers, and axially compressed to fit into the frame which forms a circumferential enclosure for the element.

Where the element is relatively wide, say twenty inches or more, it has been the practice to subdivide the frame into sub-portions, e.g. a left and right hand portion with a wall therebetween. These divider walls have been on the order of one-fourth inch wide, depriving the filter of several pleats and thus filtering capacity and have in addition required the filter web to be secured, e.g. glued, in two additional places, on either side of the divider wall, as well as to the frame end walls and side walls. More seal length means greater chance for failure, and thus the use of divider walls is not desirable.

Nonetheless, some reinforcement is needed intermediate the frame end walls for relatively elongated packs, particularly where the frame is a relatively thin plastic, e.g. 0.070 inch ABS.

SUMMARY OF THE INVENTION

It is therefore an objective of the present invention to provide a reinforced absolute filter pack without additional seal length or substantial reduction in filtering pleats.

In general this and other objectives of the invention, to become apparent hereinafter, are realized in an absolute filter pack in which certain of the spacers are replaced by support members abutting the frame side walls In supporting relation, the suppor members accordingly lying within the web pleats so that the web is continuous thereacross from frame end wall to frame end wall.

Specifically, the invention provides an absolute filter pack comprising a filter element and a circumferential frame, the filter element comprising an axially compressed filter assembly of a transversely pleated fiberglass web and spacers between adjacent web pleats, the filter assembly being secured at its perimeter to the frame walls, and plural support members located intermediate the filter element ends within the web pleats and in place of certain of the spacers normally occupying the pleats, the support members being sized to abut opposing frame side walls and secured there to support the filter assembly in the frame jointly with the frame walls while stiffening the frame. The frame may be molded synthetic organic plastic and is typically rectangular and the filter element is congruent therewith. The filter assembly spacers generally comprise elongated metal strips having transverse corrugations. The frame sidewalls may be flexible between the frame end walls and the support members may then be located to resist flexure of the sidewalls.

In a specific embodiment, the present absolute filter pack comprises a rectangular filter element and a molded synthetic organic plastic rectangular frame having end walls and side walls extending around and sealably secured to the filter element, the filter element comprising an axially compressed filter assembly of a transversely pleated fiberglass web extending uninterruptedly across the open width of the frame and corrugated metal spacers between adjacent web pleats, and support members comprising plastic inserts located within certain intermediate pleats parallel to the frame end walls and in abutting engagement with opposite frame side walls to support the filter assembly and said frame together.

BRIEF DESCRIPTION OF THE DRAWINGS

The invention will be further described as to an illustrative embodiment thereof in connection with the attached drawing in which:

FIG. 1 is a perspective view of an absolute filter element according to the invention partly broken away to show an underlying portion;

FIG. 2 is an enlarged fragmentary elevational view thereof taken on line 2—2 in FIG. 1; and FIG. 3 is a transverse sectional view thereof taken on line 3—3 in FIG. 2.

DESCRIPTION OF THE PREFERRED EMBODIMENTS

With reference now to the drawing, the absolute filter pack according to the invention is shown at 10 and comprises the filter element per se at 12 and a circumferential frame 14 which is secured to the filter element at element perimeter 16. The filter pack 10 may typically measure 23 inches in width, 5 inches in height and 3 inches in depth. With reference to FIGS. 2 and 3 the filter element is seen to comprise an elongated fiberglass web 18 which has been pleated into multiple pleats 20, successive pleats being spaced by spacers 22, being corrugated, relatively elongated strips of metal. The filter assembly of web 18 and spacers 22 is placed in frame 12 with the pleats 20 parallel to the frame end walls 24 and thus normal to frame side walls 26. The frame is molded of synthetic organic plastic such as ABS (acrylonitrile-butadiene-styrene copolymer) e.g. Cycolac, polyethylene, polypropylene, polystyrene or modified polystyrene, acrylic polymer or polyformaldehyde or like tough moldable plastic including phenolic, epoxy, urethane and similar thermosetting resins. The frame may be from 0.050 inch to about 0.100 inch in wall thickness or greater or less depending on particular applications. In general, it is desired to minimize wall thickness to maximize filter area A, equal to the open front face of the rectangular frame 14.

Because of the relatively great length, e.g. nearly two feet, of the frame side walls 26, and with a view to the pressures encountered in use and the need to maintain a sealed condition between the frame 14 and the perimeter 16 of the filter element 12 to avoid leakage, flexure of the pack is desirably avoided.

In the present invention, divider walls which have in the past made two or more separate frames along the length of frame 14 are avoided, and with them the additional sealing distance and loss of filter area, by virtue of the use of relatively thin support members, shown at 28 in the drawing. It will be observed that support members 28 are sized to engage in abutting relation, the interior opposed surfaces 6a of the side walls and in width are approximately the width of the spacers 22, so as to be substituted for and to be insertable in lieu of the spacers 22 at, e.g. pleat locations 201 and 202 located equidistantly from one another and frame end walls 24. The support members 28 are suitably rigid plastic like the frame but may be of wood.

It is to be noted that the support members 28 each are entirely within a pleat (201 or 202) whereby the integrity of the filtering web 18 is not disrupted as has been the case with divider walls. See FIG. 3 at 203 in this regard; the support members 28 are secured to the frame side walls like the pleat ends themselves, with suitable glues, and a further benefit of the invention becomes apparent: the use of the present support members does not increase assembly time or effort since the members 28 are treated essentially as an integral part of the filter element assembly. Glue lines for securing the filter element pleats 20, spacers 22 and the support members 28 are shown at 30.

When assembled, the support members 28 resist flexure of the side walls 26 and thus disruption of the integrity of the frame-filter element seal along glue line 30, and also support the filter element from passing through the frame 14 under the pressure of air being filtered entering at the front face of the pack.

Spacing of the support members 28 is not narrowly critical. One or more support members will be used at locations intermediate the frame end walls 24, e.g. at spacings of one-fifth to one-half the frontal width of the filter element and the members can vary from one-eighth to five thirty-seconds inch in thickness for a 23 inches wide unit. In this manner, the mentioned 23 inches wide filter pack may contain 88 pleats, while a conventional unit employing the usual one-fourth inch divider wall would contain only 84 pleats.

I claim:

1. A relatively elongated absolute filter pack comprising a filter element and a frame extending circumferentially thereof, aid filter element comprising an axially compressed filter assembly of a transversely pleated fiberglass web and elongated transversely corrugated spacers between adjacent web pleats, said filter assembly being secured at its perimeter to the frame walls; and plural support members located intermediate the filter element ends within the web pleats and in place of certain of said spacers normally occupying said pleats, said support members being formed of rigid plastic or wood and sized to abut opposing frame side walls and secured there to support the filter assembly in the frame jointly with said frame walls, while stiffening the frame.

2. Absolute filter pack according to claim 1 in which said pack frame is rectangular and said filter assembly is congruent therewith.

3. Absolute filter pack according to claim 1 in which the filter assembly spacers are metal strips.

4. Absolute filter pack according to claim 1 in which said support members are equidistant from each other and said end walls.

5. Absolute filter pack according to claim 1 in which said frame is molded plastic and has sidewalls which are flexible between the frame end walls and in which said support members are located to resist flexure of said sidewalls.

6. An absolute filter pack comprising a rectangular filter element and a molded synthetic organic plastic rectangular frame having end walls and side walls extending around and sealably secured to said filter element, said filter element comprising an axially compressed filter assemly of a transversely pleated fiberglass web extending uninterruptedly across the open face width of said frame and elongated, transversely corrugated metal spacers between adjacent web pleats, and support members comprising rigid plastic inserts located within certain intermediate pleats parallel to the frame end walls and in abutting engagement with opposite frame side walls to support said assembly sand said frame together.

* * * * *